Aug. 17, 1943.  C. O. DOHRENWEND  2,327,028
PROCESS FOR STRIPPING RUBBER FROM TREAD LINKS OR THE LIKE
Filed Sept. 25, 1942  3 Sheets-Sheet 1
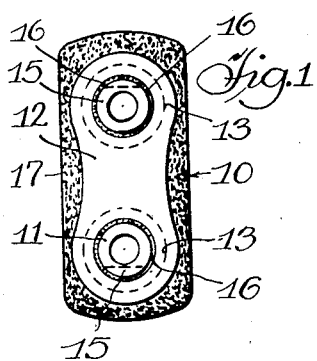
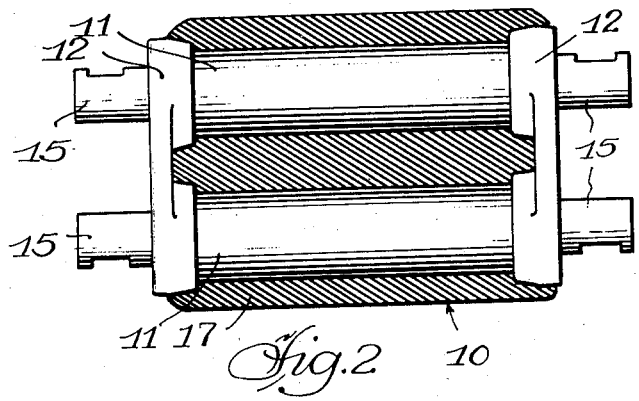
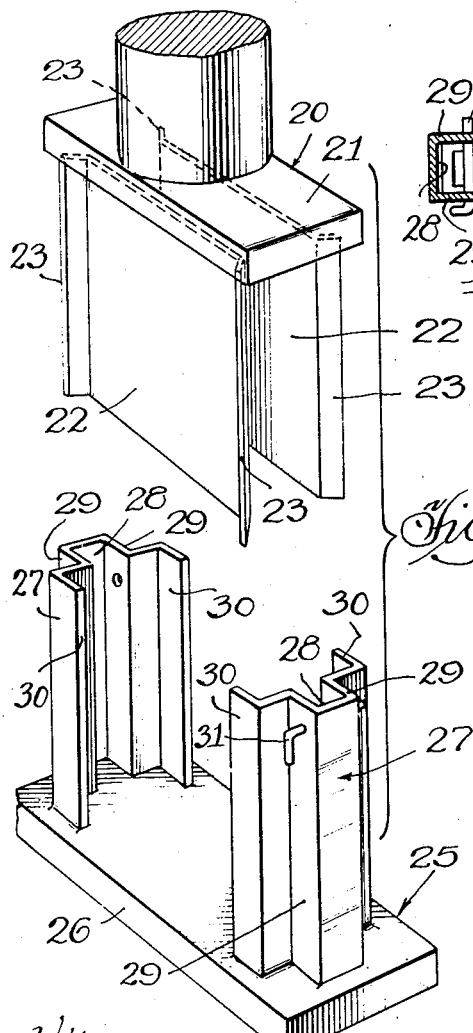
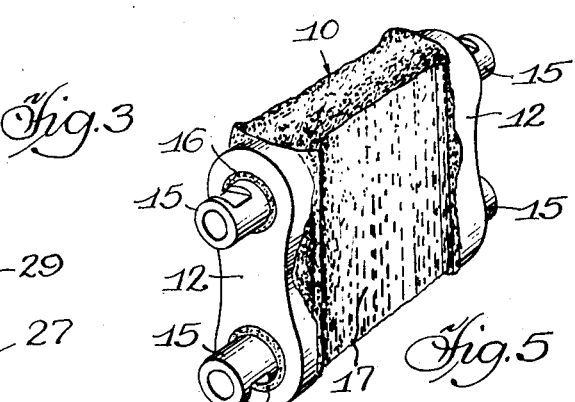
INVENTOR.
Clayton O. Dohrenwend, Aug. 17, 1943.   C. O. DOHRENWEND   2,327,028
PROCESS FOR STRIPPING RUBBER FROM TREAD LINKS OR THE LIKE
Filed Sept. 25, 1942   3 Sheets-Sheet 2
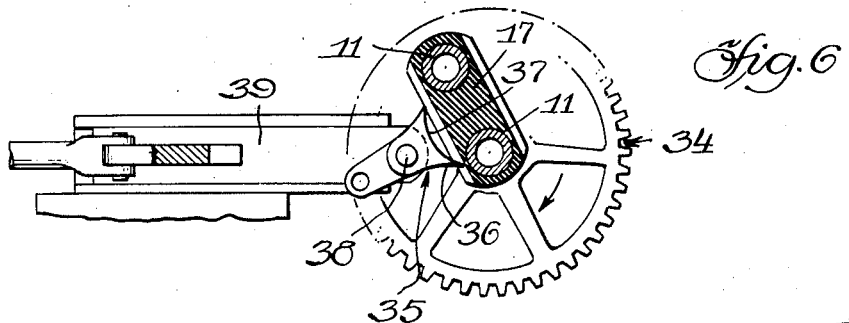
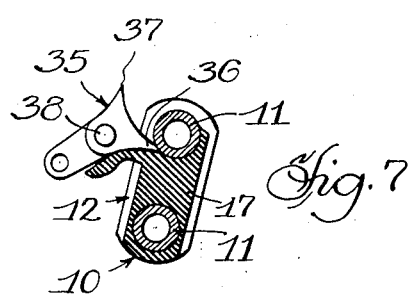
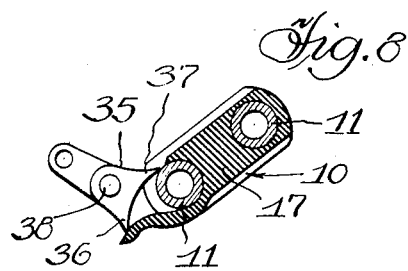
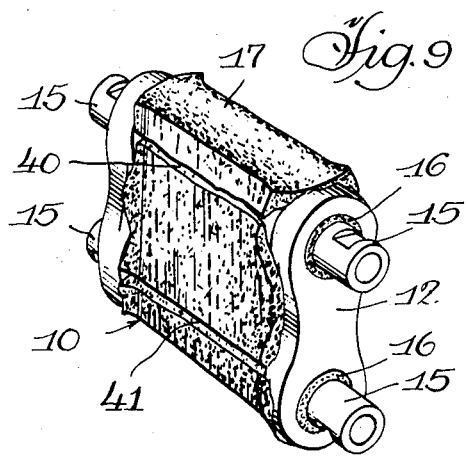
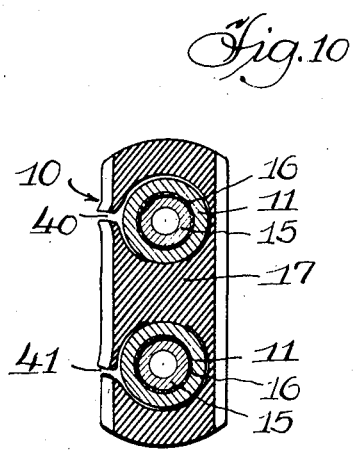
INVENTOR.
Clayton O. Dohrenwend
BY Mehlhope & Poole
Attys
Witness:
Chas. R. Hursh Aug. 17, 1943.  C. O. DOHRENWEND  2,327,028
PROCESS FOR STRIPPING RUBBER FROM TREAD LINKS OR THE LIKE
Filed Sept. 25, 1942  3 Sheets-Sheet 3
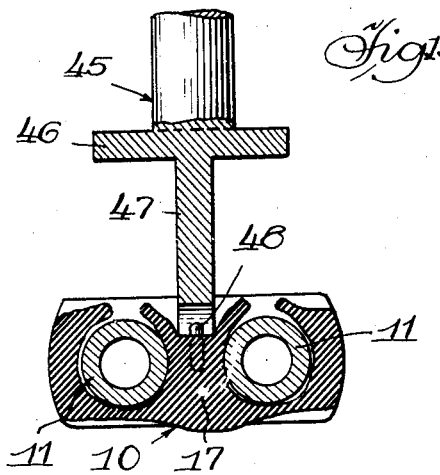
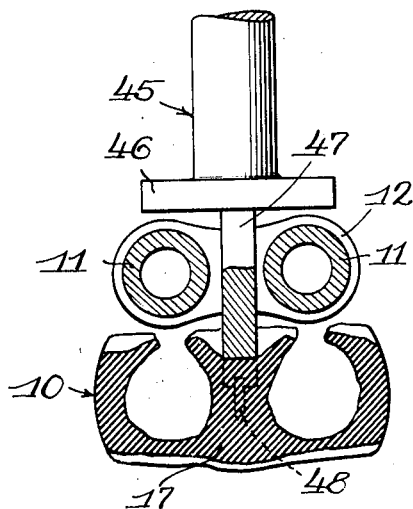
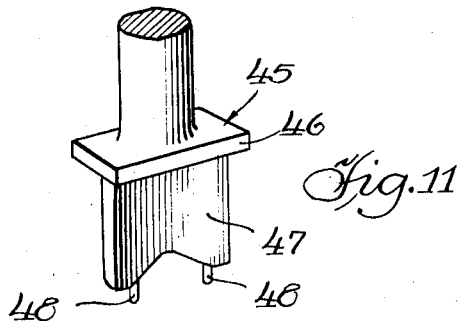
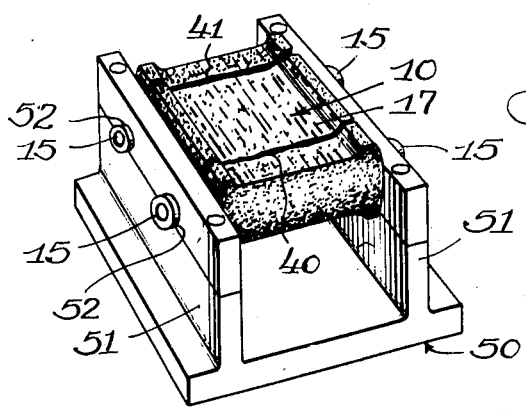
INVENTOR.
Clayton C. Dohrenwend,
BY Mehlhope & Poole
Att'ys.
Witness:
Chas. R. Hursh Patented Aug. 17, 1943

2,327,028

UNITED STATES PATENT OFFICE 2,327,028

PROCESS FOR STRIPPING RUBBER FROM TREAD LINKS OR THE LIKE

Clayton O. Dohrenwend, Blue Island, Ill., assignor to Burgess-Norton Mfg. Co., Geneva, Ill., a corporation of Illinois Application September 25, 1942, Serial No. 459,626

13 Claims. (Cl. 164—17)

This invention relates to improvements in the process for stripping the rubber from rubber treaded links employed in endless treads for vehicles such as armored war tanks. Such rubber treaded links, as heretofore widely used on such vehicles, each consists of a rectangular metal frame made up of two tubular pivot members rigidly connected at opposite ends by metal cross members and having a rubber tread molded in a solid block surrounding both tubular pivot members and filling the space between them.

Experience has shown that the tread surfaces of such rubber blocks are subject to such rapid wear and deterioration in use that it is frequently desirable to salvage and recondition the metal frames thereof for further use, either by applying a new rubber tread block, or, as is now the more common practice, by replacing the rubber tread with metal tread surfaces. To prepare the tread links for such reconditioning, it is necessary to strip or remove the rubber from the metal framework of the link. Various methods of mechanical stripping have been proposed for this purpose, with unsatisfactory results, due to the peculiar shape of the link, and also to the fact that the rubber is extremely tough and adheres to the surface of the metal framework so as to make its removal very difficult. Various other methods including the use of chemicals or heat have also been found unsatisfactory, because they destroy the usefulness of the rubber bushings or sleeves of resilient rubber contained within the tubular pivot members of the tread links so as to require the insertion of new rubber bushings, thereby losing valuable rubber, and increasing the cost of reconditioning.

In carrying out my invention, I provide a novel method for stripping or removing the rubber from the metal frames of the tread links whereby such work can be expeditiously and economically carried out with a minimum amount of labor, and without removing the pivot pins or the rubber bushings from the tubular members of the tread link frame.

The invention may best be understood by reference to the accompanying drawings, in which Figure 1 is an end view of a tread link of standard rubber-covered construction, prior to treatment by my improved process.

Figure 2 is a top plan view showing the metal framework of the tread link, with the surrounding rubber block shown in section.

Figure 3 is a composite view showing an improved form of knife and tread link holding device which cooperate in performing the first stage of my improved process, which consists in shearing away the upper and lower tread surfaces of the rubber block.

Figure 4 is a view in horizontal section illustrating the method of use of the shearing knife and holding device shown in Figure 3.

Figure 5 is a view showing a tread block after its upper and lower surfaces have been removed by the shearing operation illustrated in Figures 3 and 4.

Figure 6 is a view showing the tread link in the second or scarfing stage of the process, wherein it is placed in a suitable rotating holder to be acted upon by a double-edged knife so that the rubber may be scarfed successively from around each of the tubular pivot members.

Figure 7 shows the link after it has been rotated in one direction with one blade of the knife in scarfing engagement to remove a portion of the rubber from the tubular member.

Figure 8 shows the third position of the tread link in which the direction of rotation has been reversed and the other blade of the knife has been brought into scarfing engagement with the tubular member.

Figure 9 is a perspective view showing the tread block after it has completed its second or scarfing stage of the operation, as illustrated in Figures 6, 7 and 8.

Figure 10 is a vertical section taken through the block illustrated in Figure 9 and showing the result of the scarfing operation on both pivot members.

Figure 11 shows a form of mechanical punch which may be used in the third step of my improved process, for finally removing the rubber block from the metal frame of the tread.

Figure 12 shows a holder for the tread used in conjunction with the punch shown in Figure 11.

Figure 13 is an enlarged transverse section illustrating the initial position of the punch with respect to the tread block.

Figure 14 shows the final position of the punch after the surrounding rubber has been finally stripped or removed from the metal frame of the link.

Referring now more particularly to the details of the embodiment of my invention as illustrated in the drawings, it will be understood that the improved process for stripping the rubber from the metal frames of the tread links consists essentially of three steps as follows:

The first operation consists of shearing the excess rubber from the upper and lower surfaces of the tread link to levels closely adjacent the metal parts comprising the tread link frame, as shown in Figures 3, 4 and 5; the second operation consists in cutting or scarfing the rubber away from around the two tubular pivot members of the tread link frame, as illustrated in Figures 6 to 10, inclusive; and the final operation consists in punching out the rubber from between the tubular pivot members so as to remove the entire rubber block as illustrated in Figures 11 to 13, both inclusive.

Referring first to the details of construction of the tread links for which my improved stripping process is particularly designed, one of such tread links, indicated at 10, 10 in Figure 1, is originally formed with a metal base consisting of two tubular pivot members 11, 11 in parallel spaced relation to each other, and rigidly connected at opposite ends by metal cross members 12, 12, each having eyes 13, 13 at opposite ends thereof, in which the metal pivot members 11, 11 are fixed by brazing, welding or the like. Pivot pins 15 extend through each of the tubular pivot members 11, 11, and rubber sleeves 16, 16 are interposed between each of said pivot pins 15 and the inner surface of their respective tubular member 11 so as to permit a limited torsional movement of the pivot pins in said tubular members (see Figure 1). As the tread link is originally produced, a rubber tread is formed by molding a solid block of rubber 17 around and between the tubular pivot members 11, 11, said block terminating short of the outer faces of the metal connecting members 12, 12 as shown in Figures 1 and 2. The flattened faces thereof which form the upper and lower bearing surfaces thereof are originally formed symmetrical with respect to the metal frame, so that the tread links are ordinarily reversible. Of course, the tread surface of the lower face wears more rapidly than the upper face, but even when the tread link is reversed, the rubber tread surfaces are subject to such rapid wear that the tread link soon becomes useless. In order to be salvaged or reconditioned for further use, the rubber tread must be removed and new tread surfaces substituted therefor. Owing to the scarcity of rubber, a preferred method of reconditioning now employed consists in replacing the rubber blocks by metal tread surfaces. But regardless of whether rubber or metal is used for replacement of the tread surfaces, it is desirable to removal all of the rubber from the exterior surfaces of the metal frame of each link without harming or disturbing the resilient rubber bushings 16, 16 within the tubular members 11, 11 and surrounding the pivot pins 15, 15 as previously described.

With the above objects of my improved process now in mind, the first step of reconditioning illustrated in Figures 3, 4 and 5 usually consists in shearing the excess rubber from the upper and lower tread surfaces of the tread block to levels closely adjacent the metal parts comprising the tread link frame, so as to reduce the thickness of the rubber tread to a minimum, and thus facilitate the scarfing operation which is to follow. Therefore, in all cases where the upper and lower surfaces of the rubber block have not already been worn down to levels closely adjacent the tubular pivot members 11, 11, it is desirable to shear the excess rubber from both tread surfaces before any attempt is made to cut or scarf the rubber away from around said tubular pivot members.

Figure 3 illustrates a simple mechanical apparatus for carrying out the first or shearing operation. This apparatus consists of a duplex cutter indicated generally at 20 and consisting of a top plate 21 having a pair of parallel shearing knives 22, 22 depending therefrom and spaced from each other a distance which is slightly greater than the diameter of the tubular pivot members 11, 11 of the tread link. In the preferred form shown, the knives 22, 22 each have outwardly inclined extremities 23, 23 along opposite sides thereof which are adapted to extend outwardly at such an angle as to pass over the enlarged eye portions 13 of the metal connecting members 12, 12 of the tread link frame, as clearly shown in Figure 4. The cutter 20 with its cutting blades is adapted to be used in cooperation with a holding device indicated generally at 25 and consisting of a base 26 and a pair of upright standards 27, 27 at opposite ends thereof. Said standards are each formed with a centrally disposed, inwardly facing groove 28, the side walls 29, 29 of which are spaced apart so as to receive the pivot pins 15, 15 of the tread link frame with said pivot pins 15, 15 in vertically aligned position therein. At opposite sides of the central grooved portion 28 of each upright standard 27 are flanged side walls 30, 30 which are spaced apart and extend inwardly toward each other a sufficient distance to engage the extreme margins of the outwardly inclined extremities 23, 23 of the knife blades 22, 22, as also clearly shown in Figure 4.

A pair of pins 31, 31 are removably inserted transversely of the central grooved portions 28, 28 of the standards 27 adjacent the upper end thereof, so as to hold the upper pivot pins 15, 15 in the holding member when the cutting knives 22, 22 are withdrawn upwardly after the shearing is completed.

With the apparatus above described, the first or shearing operation can be expeditiously accomplished in a power press of any suitable kind, capable of exerting sufficient pressure on the cutting knives 22, 22 so as to shear the excess rubber simultaneously from both tread surfaces of the tread link when the latter is mounted in the holding device 25, as shown in Figure 4. Figure 5 shows the tread link after it has been operated upon by the shearing apparatus, and is ready for the scarfing operation to follow.

It will be understood, of course, that in some instances already suggested above, where both rubber tread surfaces have become worn down to a level closely adjacent the tubular members 11, 11, the shearing operation hereinbefore described may be dispensed with. In a majority of cases, however, the shearing operation will be found to be of importance to the proper functioning of the scarfing operation, because the rubber is so tough and resistant that it is extremely difficult to cut it away from the tubular members without prior removal of any excess thicknesses of the tread surfaces.

The second or scarfing step of the process consists essentially of cutting the rubber block from around the two tubular members 11, 11 by rotating the latter members successively relative to a knife blade which is presented in tangential relation thereto. This scarfing operation may be carried out with various forms of apparatus. For illustrative purposes the apparatus disclosed in Figures 6, 7 and 8 comprises parts of a stripping mechanism forming the subject matter of my co-pending application bearing Serial No. 459,625 filed September 25, 1942. Said mechanism includes a suitable holding member 34 which may be rotated by power in opposite directions at will. The tread link is initially mounted on said rotating member by any suitable holding device (not shown), with one of its tubular members 11 arranged concentrically with the axis of rotation of said rotating member. A scarfing or stripping knife indicated generally at 35 is formed with an arcuate front face terminating in cutting edges 36, 37, each of substantially the same length as the tubular members 11, 11. Said knife is pivotally mounted on pin 38 carried by a ram member 39 which may be operated by suitable power means so as to move the knife bodily toward and away from the axis of rotation of the holding member 34. The operation of the illustrative apparatus shown in Figures 6, 7 and 8 may be described as follows:

The lower knife edge 36 is first presented into cutting position parallel to the centered tubular member 11 along one tread surface of the rubber block, where the rubber is thinnest over the latter. The holding member 34 is then rotated in a clockwise direction as indicated in Figure 6, so that the knife blade 36 is forced inwardly to scrape against the surface of the tubular member 11. Such rotation is continued until the tread link reaches a position substantially as shown in Figure 7, wherein it is seen that the lower knife 36 has cut around the outer face of the tubular member and has been projected inwardly between the two tubular members 11, 11 to a line almost in a common median plane intersecting the axes of said tubular members, as will hereinafter be more fully described. I find that in practice it is usually unnecessary to cut any further than within several degrees of this median plane as shown in Figure 7, because the third or punching operation to be hereinafter described can usually be depended upon to remove substantially all of the rubber which may remain unsevered from the tubular members during the scarfing operation.

After the lower cutting blade 36 has completed its cut to the position substantially as shown in Figure 7, the direction of rotation of the holding member 34 is reversed into a counter-clockwise direction. At a suitable time before the tread link reaches a position substantially as shown in Figure 8, the knife 35 is rocked on its pivot 38 so that the upper cutting knife 37 is brought into scarfing engagement with the surface of the tubular member 11 from which the rubber has previously been stripped. Continued rotation of the tread link in a counter-clockwise direction will cause the upper blade 37 to strip or scarf the rubber from around the opposite side face of the tubular member 11, until said blade has penetrated between the two tubular members 11, 11 to a point within a few degrees from the median plane intersecting the longitudinal axes of said tubular members.

When the first tubular member has been scarfed as thus described, the knife 35 is moved out of engagement with the tread link, said link is then removed from the rotating holder 34, and the scarfing operation is then repeated on the second tubular member 11. In this case, however, it is preferable that after removing the tread link from the holder, it is reversed end to end in said holder so that the cutting blade 36 will initially engage the second tubular member and start the scarfing operation on the same side or tread surface of the block as it did in making its initial cut relative to the first tubular member. As a result, after the scarfing operation is completed on both tubular members 11, 11, the tread block will have the appearance shown in Figures 9 and 10, wherein it will be noted that the initial line of cut indicated at 40, where the knife entered the rubber block adjacent the first tubular member 11, will be disposed on the same side or tread surface of said block as the second cut 41, where the knife entered in said block adjacent the second tubular member 11.

In Figure 10 it will also be observed that when the scarfing operation is finished, the remaining rubber will usually resume its normal position about the two tubular members 11, 11, while a strip of rubber remains in adhering condition to said tubular members only along a relatively narrow uncut area between the inner opposed surfaces of said tubular members.

The third and final operation consists in removing the rubber block from the metal framework by a suitable punching operation, which may, for illustrative purposes, be performed by a mechanism of the general character illustrated in detail in Figures 11 and 12. The punch indicated at 45 consists of a base plate 46 having an upright plunger 47 generally rectangular in cross section and having its horizontal dimensions slightly less than the rectangular space formed between the two tubular members 11, 11 and the end members 12, 12. In the preferred form shown, the lower or engaging face of the plunger 47 is provided with a pair of projecting pins 48, 48 adjacent its outer edges and with its intermediate lower surface cut away in the form of a widely flared inverted V, as clearly shown in Figure 11. In connection with the punch 45, a holding device similar to that indicated at 50 in Figure 12 may be employed for mounting the tread link during the punching operation. Said holding device consists of a pair of spaced upright supports 51, 51 each having a pair of apertures 52, 52 at opposite sides thereof for detachably receiving the pivot pins 15, 15 of the tread link. The body portion of the tread link is suspended between said upright supports 51, 51, with the slots 40 and 41 formed by the knife 35 during the scarfing operation presented upwardly toward the plunger 47 of the punch 45. The plunger 47 is brought downwardly into engagement with the rubber block, in registering relation between the tubular members 11, 11 as indicated in Figure 13. The pins 48, 48 initially engage the rubber so as to avoid undesirable lateral shifting movement of the rubber while it is being acted upon by the punch. Movement of the punch through the tread link serves to remove the entire block of rubber from the metal frame, as illustrated in Figures 13 and 14, thereby effecting the completion of the stripping operation.

It will be understood that any particles of rubber which may adhere to the metal surfaces of the tread link frame after completion of the stripping process may be readily removed in any suitable manner such as by air blast.

Although I have shown and described certain forms of apparatus in connection with my improved process, it will be understood that my invention is not necessarily limited to the use of such apparatus or of the several operations described in connection therewith, excepting in so far as specifically pointed out in the appended claims.

I claim as my invention:

1. The method of stripping a solid rubber tread block from a rectangular tread link frame having parallel pivot members, which includes the steps of scarfing the rubber around each of said pivot members, and then punching out the rubber block from between said pivot members.

2. The method of stripping a solid rubber tread block from a rectangular tread link frame having parallel pivot members, which includes the steps of shearing the rubber along the opposite tread surfaces of said block substantially to the level of said pivot members, then scarfing the rubber around each of said pivot members, and then punching out the rubber block from between said pivot members.

3. The method of stripping a solid rubber tread block from a rectangular tread link frame having parallel pivot members, which includes the steps of scarfing the rubber around each of said pivot members by rotating said tread link in reverse directions about the axis of each of said pivot members while forcing a cutting blade tangentially toward said pivot member in each direction of rotation, and then punching out the rubber block from between said pivot members.

4. The method of stripping a solid rubber tread block from a rectangular tread link frame having parallel pivot members, which includes the steps of scarfing the rubber around each of said pivot members from the same side of said block, and then punching out the rubber block from between said pivot members.

5. The method of stripping a solid rubber tread block from a rectangular tread link frame having parallel pivot members, which includes the scarfing of the rubber around each of said pivot members by rotating said tread link in reverse directions about the axis of each of said pivot members while forcing a cutting blade tangentially toward said pivot member in each direction of rotation, the scarfing of both pivot members being initiated from the same tread surface of said block.

6. The method of stripping a solid rubber tread block from a rectangular tread link frame having parallel pivot members, which includes the steps of shearing the rubber along the opposite tread surfaces of said block substantially to the level of said pivot members, then scarfing the rubber around each of said pivot members by rotating said tread link in reverse directions about the axis of each of said pivot members while forcing a cutting blade tangentially toward said pivot member in each direction of rotation, and then punching out the rubber block from between said pivot members.

7. The method of stripping a solid rubber tread block from a rectangular tread link frame having parallel pivot members, which includes the steps of shearing the rubber along the opposite tread surfaces of said block substantially to the level of said pivot members, then scarfing the rubber around each of said pivot members, the scarfing of both pivot members being initiated from the same tread surface of said block, and then punching out the rubber block from between said pivot members.

8. The method of stripping a solid rubber tread block from a rectangular tread link frame having parallel pivot members, which includes the steps of scarfing the rubber around each of said pivot members by rotating said tread link in reverse directions about the axis of each of said pivot members, while forcing a cutting blade tangentially toward said pivot member in each direction of rotation, said tread link frame being reversed end to end between the scarfing operations on said pivot members so that the scarfing of both members is initiated from the same tread surface of the block, and then punching out the rubber block from between said pivot members.

9. The method of stripping a solid rubber tread block from a rectangular tread link frame having parallel pivot members, which includes the steps of scarfing the rubber around each of said pivot members, excepting along the opposing inner surfaces of said pivot members, and then punching out the rubber block from between said pivot members.

10. The method of stripping a solid rubber tread block from a rectangular tread link frame having parallel pivot members, which includes the steps of scarfing the rubber around the end and two side surfaces of each of said pivot members, and then punching out the rubber block from between said pivot members.

11. The method of stripping a solid rubber tread block from a rectangular tread link frame having parallel pivot members, which includes the steps of scarfing the rubber around each of said pivot members from the same side of said block, but leaving an unsevered portion along each of the opposing inner surfaces of said pivot members, and then punching out the rubber block from between said pivot members.

12. The method of stripping a solid rubber tread block from a rectangular tread link frame having parallel pivot members, which includes the steps of shearing the rubber along the opposite tread surfaces of said block substantially to the level of said pivot members, then scarfing the rubber around each of said pivot members by rotating said tread link in reverse directions about the axis of each of said pivot members while forcing a cutting blade tangentially toward said pivot member in each direction of rotation, but leaving an unsevered portion along each of the opposing inner surfaces of said pivot members, and then punching out the remainder of the rubber block from between said pivot members.

13. The method of stripping a solid rubber tread block from a rectangular tread link frame having parallel pivot members, which includes the steps of shearing the rubber along the opposite tread surfaces of said block substantially to the level of said pivot members, then scarfing the rubber around the end and two side surfaces of each of said pivot members, the scarfing of both pivot members being initiated from the same tread surface of said block, and then punching out the remainder of the rubber block from between said pivot members.

CLAYTON O. DOHRENWEND.